2,987,789
METHODS OF MAKING SAND CORES OR MOLDS FOR METAL CASTING
Rolf Erhard Morén, Alfredshem, Sweden, assignor to Mo Och Domsjö Aktiebolag, Ornsköldsvik, Sweden, a corporation of Sweden
No Drawing. Filed Aug. 11, 1958, Ser. No. 754,154
Claims priority, application Sweden Sept. 5, 1957
22 Claims. (Cl. 22—193)

The present invention relates to a method of making sand molds or sand cores for metal casting and is in some measure an improvement of the so-called $CO_2$ method of making molds and cores.

In the usual $CO_2$ method water glass is added to the sand employed for making the molds or cores and after forming the mold or core it is treated with carbon dioxide which reacts with the water glass so that the mold or core hardens.

This method has a number of disadvantages. Above all the molds and cores manufactured by this method show an incomplete disintegration after casting which renders it difficult to clean the castings. To improve the disintegration a number of special additives have been proposed.

The main object of the present invention is to provide a method of making molds or cores for metal casting by a technique similar to the $CO_2$ method, but which produces molds and cores which disintegrate more readily after casting. Other objects and advantages will appear as the description proceeds.

According to the present invention it was found that the above-mentioned disadvantage of the normal $CO_2$ method can be removed and other advantages gained by adding to the sand an alkaline earth metal hydroxide or oxide, in particular calcium hydroxide or oxide, preferably in combination with an organic binder, and treating molds and cores produced from the sand thus obtained with carbon dioxide. It was found that the disintegration of molds and cores thus produced is completely satisfactory.

In some cases it is possible to use the alkaline earth metal hydroxide or oxide alone without adding other binders. Generally, however, a sufficient strength will not be obtained in this manner and preferably, therefore, an organic binder is added. Examples of suitable binders are water-soluble cellulose esters and ethers, such as methylcellulose, ethylcellulose, hydroxyethylcellulose, methyl-ethylcellulose, carboxymethylcellulose, ethyl-hydroxyethylcellulose, sulfoethylcellulose, hydroxyethyl-carboxymethylcellulose, cellulose sulfate etc., sugars, starch, dextrin and other polysaccharides, thermosetting plastics, such as phenoplastics, urea plastics, melamine plastics, if desired combined with hardening agents, thermoplastics, such as polyvinyl chloride, and glue, natural resins, casein, sulfite waste liquor, core oils (drying oils) and others. Preferred binders are water-soluble cellulose ethers and thermosetting plastics.

If desired, it is possible in special cases to combine the process of this invention with the normal $CO_2$ method by adding water glass, but thereby some of the advantages of the invention will be partly lost. It is also possible, in combination with alkaline earth metal hydroxide or oxide to use plaster of Paris or cement. The cement may be combined with a suitable accelerator, e.g., colcium chloride. In some cases it is possible to use the alkaline earth metal hydroxide or oxide together with other inorganic or organic bases, e.g. ammonia or mono- or triethanolamine. Thereby under certain conditions an improvement of the dry strength is obtained and in addition the moisture of the sand and thus in the resulting mold or core can be reduced.

When the addition of alkaline earth metal hydroxide or oxide is combined with organic binders e.g. cellulose ethers, plastics or core oils, the process of this invention may be carried out so that treatment with carbon dioxide takes place until the core or mold is sufficiently hard to permit pouring. However, it is also possible to treat the mold or core with carbon dioxide only until it has sufficient firmness to be capable of being handled and then bake it in a furnace until sufficient hardness is obtained.

The amount of calcium hydroxide or oxide or other alkaline earth metal hydroxide or oxide added should be about 1 to 10% of the weight of sand while the amount of organic binder may be 0.1 to 3%. The moisture content of the sand should be 0.5 to 6%. The amount of cement or plaster of Paris, if such is used, may be 0.1 to 5%.

In addition to the abovementioned advantage of a better disintegration of the cores and molds, the process of this invention has other advantages as compared to the normal $CO_2$ method. Water glass is strongly alkaline and irritates the skin as well as attacks the painting in core boxes. It is true that alkaline earth metal hydroxides are also alkaline, but they are less irritating and they do not attack the painting so strongly. Furthermore, water glass and water-glass-containing sand have a short storage life, in that the water glass rapidly reacts with the carbon dioxide of the air. The sand mix obtained by the process of this invention is not so sensitive in this respect. Water glass is liquid, while the alkaline earth metal hydroxides and oxides can be obtained in pulverulent form and are therefore more easily measured and are more rapidly mixed with the sand. Thus, it is possible to provide a binder composition in pulverulent form comprising a mixture of alkaline earth metal hydroxide and a suitable organic binder, such as a cellulose ether, in suitable proportions to be admixed to the sand. In addition it is not necessary to work with dry sand, as is the case when water-glass is used.

When gassing the cores and molds prepared with carbon dioxide the corresponding alkaline earth metal carbonate is formed. When the metal is poured this is decomposed to form alkaline earth metal oxide and carbon dioxide. Therefore, the sand can be used again for making cores or molds after adding water and, if desired, an organic binder. Preferably, however, such return sand is mixed with fresh sand to prepare new molds or cores.

To prepare the sand mix for the manufacture of the molds or cores in accordance with this invention the alkaline earth metal hydroxide or oxide, preferably together with an organic binder, is added to dry or moist sand in a suitable mixer such as a common core or form sand mixer and sufficient water is added if necessary to achieve the desired moisture content as indicated above. The suitable moisture content in any specific case should be determined by preliminary tests, since it varies with the grade of sand, the working time and the specific mode of operation. It is to be understood that when an alkaline earth metal oxide is added it reacts with the water to form the corresponding hydroxide.

The normal time of blending the mix is 2 to 6 minutes depending on the efficiency of the mixing apparatus. The mix should not be agitated so long that it becomes warm and for this reason a speed muller or an edge-runner mill is to be preferred to the types of mixers which give a high frictional heat.

The sand mix obtained in accordance with this invention will dry superficially after a few hours of storage in air. Therefore, if the sand mix is not to be used immediately it should be covered with a wet cloth or the like or the amount of water added should be slightly increased when the sand mix is prepared. A sand mix which has been dried but has not been treated with carbon dioxide can still be used if a suitable amount of water is added thereto.

The molds and cores can be produced from the sand mix of this invention in the same manner as from usual molding sand. When making molds it is possible to remove the pattern before treating the mold with carbon dioxide since a high green strength is obtainable.

Treatment with carbon dioxide is preferably carried out by covering the mold flask or core box with a cover which has an inlet which can be connected to a source of carbon dioxide to blow the gas into the mold cavity or toward the core surface.

The invention is illustrated by the examples below. In examples 1–18 the sand and the binders were blended for about ½ minute. Thereupon water was added and the mix further blended for about 5 minutes. From the blended mix standard cylindrical testing cores (diameter 5 cm., height 5 cm.) were made, which were treated in the core box on one side with carbon dioxide under a pressure of 2 kg. per sq. cm. for 20 seconds. The green compressive strength was measured on the core before treatment with carbon dioxide and is given in g. per sq. mm. The shear strength and the compressive strength (in kg. per sq. cm.) were measured on the carbon dioxide-treated core immediately after gassing and after storage for 1 hour, 2 hours, 4 hours and 24 hours at room temperature. The sand used was a core sand having an average particle size of 0.23 mm. The calcium hydroxide used was a commercial product having a $Ca(OH)_2$ content of 90–95%. The amounts of binder added are given in percent by weight based on the dry sand.

*Example 1*

Binder: Calcium hydroxide _____ 2%.
Water _____ 3%.
Green compressive strength _____ 0.73.
Shear strength _____ Not measurable.
Compressive strength _____ Not measurable.

*Example 2*

Binders:
    Calcium hydroxide _____ percent__ 4
    Ethyl-hydroxyethylcellulose _____ do____ 0.4
Water _____ do____ 4
Green compressive strength _____ 0.80
Shear strength:
    Immediately _____ 0.24
    1 h. _____ 0.25
    2 h. _____ 0.26
    4 h. _____ 0.41
    24 h. _____ 1.45
Compressive strength:
    Immediately _____ 0.90
    1 h. _____ 1.00
    2 h. _____ 1.00
    4 h. _____ 1.40
    24 h. _____ 4.40

*Example 3*

Binders:
    Calcium hydroxide _____ percent__ 2
    Ethyl-hydroxyethylcellulose _____ do____ 0.4
Water _____ do____ 3
Green compressive strength _____ 0.67
Shear strength:
    Immediately _____ 0.32
    1 h. _____ 0.13
    2 h. _____ 0.19
    4 h. _____ 0.55
    24 h. _____ 1.40
Compressive strength:
    Immediately _____ 1.10
    1 h. _____ 0.65
    2 h. _____ 0.85
    4 h. _____ 1.25
    24 h. _____ 2.90

*Example 4*

Binders:
    Calcium hydroxide _____ percent__ 2
    Ethyl-hydroxyethylcellulose _____ do____ 0.4
Water _____ do____ 3
Green compressive strength _____ 0.85
Shear strength:
    Immediately _____ 0.29
    1 h. _____ 0.43
    2 h. _____ 0.46
    4 h. _____ 0.71
    24 h. _____ 3.20
Compressive strength:
    Immediately _____ 1.50
    1 h. _____ 1.90
    2 h. _____ 2.30
    4 h. _____ 2.75
    24 h. _____ 12.40

*Example 5*

Binders:
    Calcium hydroxide _____ percent__ 2
    Ethyl-hydroxyethylcellulose _____ do____ 0.4
Water _____ do____ 3
Green compressive strength _____ 1.51
Shear strength:
    Immediately _____ 0.70
    1 h. _____ 0.80
    2 h. _____ 0.53
    4 h. _____ 0.73
    24 h. _____ 2.70
Compressive strength:
    Immediately _____ 1.83
    1 h. _____ 1.95
    2 h. _____ 1.60
    4 h. _____ 2.80
    24 h. _____ 8.60

*Example 6*

Binders:
    Calcium hydroxide _____ percent__ 2
    Carboxymethylcellulose _____ do____ 0.4
Water _____ do____ 3
Green compressive strength _____ 1.97
Shear strength:
    Immediately _____ 0.40
    1 h. _____ 0.55
    2 h. _____ 0.37
    4 h. _____ 0.43
    24 h. _____ 1.80
Compressive strength:
    Immediately _____ 1.15
    1 h. _____ 1.70
    2 h. _____ 1.40
    4 h. _____ 1.60
    24 h. _____ 4.25

*Example 7*

Binders:
    Calcium hydroxide _____ percent__ 2
    Methylcellulose _____ do____ 0.4
Water _____ do____ 3
Green compressive strength _____ 1.20
Shear strength:
    Immediately _____ 0.25
    1 h. _____ 0.35
    2 h. _____ 0.33
    4 h. _____ 0.45
    24 h. _____ 2.50

Compressive strength:
  Immediately _____ 0.90
  1 h. _____ 1.40
  2 h. _____ 1.40
  4 h. _____ 2.00
  24 h. _____ 10.20

*Example 8*

Binders:
  Calcium hydroxide _____percent__ 2
  Methylcellulose _____do____ 0.4
Water _____do____ 3
Green compressive strength _____ 1.51
Shear strength:
  Immediately _____ 0.30
  1 h. _____ 0.49
  2 h. _____ 0.53
  4 h. _____ 0.79
  24 h. _____ 3.80
Compressive strength:
  Immediately _____ 1.30
  1 h. _____ 2.20
  2 h. _____ 2.45
  4 h. _____ 3.50
  24 h. _____ >13.00

*Example 9*

Binders:
  Calcium hydroxide _____percent__ 2
  Hydroxyethylcellulose _____do____ 0.4
Water _____do____ 3
Green compressive strength _____ 1.03
Shear strength:
  Immediately _____ 0.50
  1 h. _____ 0.55
  2 h. _____ 0.70
  4 h. _____ 0.50
  24 h. _____ 2.50
Compressive strength:
  Immediately _____ 1.70
  1 h. _____ 1.50
  2 h. _____ 2.40
  4 h. _____ 1.70
  24 h. _____ >13.00

*Example 10*

Binders:
  Calcium hydroxide _____percent__ 2
  Sodium cellulose sulfate _____do____ 0.4
Water _____do____ 3
Green compressive strength _____ 1.35
Shear strength:
  Immediately _____ 0.60
  1 h. _____ 0.58
  2 h. _____ 0.80
  4 h. _____ 0.50
  24 h. _____ 2.10
Compressive strength:
  Immediately _____ 2.00
  1 h. _____ 2.20
  2 h. _____ 2.70
  4 h. _____ 1.80
  24 h. _____ 6.70

*Example 11*

Binder: Calcium hydroxide _____percent__ 4
Water _____do____ 3
Green compressive strength _____ 1.24
Shear strength:
  Immediately _____ 0.58
  1 h. _____ 0.75
  2 h. _____ 0.85
  4 h. _____ 1.00
  24 h. _____ 1.40

Compressive strength:
  Immediately _____ 1.60
  1 h. _____ 1.90
  2 h. _____ 2.00
  4 h. _____ 2.40
  24 h. _____ 3.40

*Example 12*

Binders:
  Calcium hydroxide _____percent__ 4
  Ethyl-hydroxyethylcellulose __do____ 0.4
Water _____do____ 4
Green compressive strength _____ 2.01
Shear strength:
  Immediately _____ 0.45
  1 h. _____ 0.75
  2 h. _____ 0.63
  4 h. _____ 0.85
  24 h. _____ 2.30
Compressive strength:
  Immediately _____ 2.00
  1 h. _____ 2.40
  2 h. _____ 2.00
  4 h. _____ 2.50
  24 h. _____ 8.20

*Example 13*

Binders:
  Calcium hydroxide _____percent__ 4
  Carboxymethylcellulose _____do____ 0.4
Water _____do____ 4
Green compressive strength _____ 2.51
Shear strength:
  Immediately _____ 0.85
  1 h. _____ 1.00
  2 h. _____ 1.40
  4 h. _____ 0.78
  24 h. _____ 1.90
Compressive strength:
  Immediately _____ 3.10
  1 h. _____ 3.50
  2 h. _____ 3.70
  4 h. _____ 2.70
  24 h. _____ 5.20

*Example 14*

Binders:
  Calcium hydroxide _____percent__ 4
  Methylcellulose _____do____ 0.4
Water _____do____ 4
Green compressive strength _____ 2.10
Shear strength:
  Immediately _____ 0.50
  1 h. _____ 0.80
  2 h. _____ 0.75
  4 h. _____ 1.00
  24 h. _____ 2.90
Compressive strength:
  Immediately _____ 2.00
  1 h. _____ 3.50
  2 h. _____ 3.00
  4 h. _____ 3.30
  24 h. _____ >13.00

*Example 15*

Binders:
  Calcium hydroxide _____percent__ 4
  Hydroxyethylcellulose _____do____ 0.4
Water _____do____ 4
Green compressive strength _____ 1.51
Shear strength:
  Immediately _____ 1.00
  1 h. _____ 0.75
  2 h. _____ 0.90
  4 h. _____ 0.75
  24 h. _____ 2.00

Compressive strength:
- Immediately ............................. 4.60
- 1 h. ...................................... 2.00
- 2 h. ...................................... 3.00
- 4 h. ...................................... 2.70
- 24 h. ..................................... 9.50

*Example 16*

Binders:
- Calcium hydroxide .............percent.. 4
- Sodium cellulose sulfate ..........do.... 0.4
- Water .............................do.... 4
- Green compressive strength ............. 1.99

Shear strength:
- Immediately ............................. 0.50
- 1 h. ...................................... 0.40
- 2 h. ...................................... 1.30
- 4 h. ...................................... 0.73
- 24 h. ..................................... 1.10

Compressive strength:
- Immediately ............................. 1.90
- 1 h. ...................................... 1.70
- 2 h. ...................................... 3.00
- 4 h. ...................................... 2.00
- 24 h. ..................................... 5.50

*Example 17*

Binders:
- Calcium hydroxide .............percent.. 4
- Ethyl-hydroxyethylcellulose ......do.... 0.8
- Urea resin .......................do.... 0.5
- Water ...........................do.... 4
- Green compressive strength ............. 2.23

Shear strength:
- Immediately ............................. 2.40
- 1 h. ...................................... 1.65
- 2 h. ...................................... 1.45
- 4 h. ...................................... 1.75
- 24 h. ..................................... 2.25

Compressive strength:
- Immediately ............................. 7.35
- 1 h. ...................................... 6.10
- 2 h. ...................................... 4.90
- 4 h. ...................................... 6.35
- 24 h. ..................................... 8.15

*Example 18*

Binders:
- Calcium hydroxide .............percent.. 8
- Ethyl-hydroxyethylcellulose ......do.... 0.4
- Mannitol ........................do.... 0.01
- Water ...........................do.... 6
- Green compressive strength ............. 2.50

Shear strength:
- Immediately ............................. 0.85
- 1 h. ...................................... 0.75
- 24 h. ..................................... 3.40

Compressive strength:
- Immediately ............................. 3.00
- 24 h. ..................................... 14.0

*Example 19*

To investigate the risk of decrease in strength on excessive gassing a sand mix of the following composition was prepared in the same manner as in Examples 1–18.

Binders:
- Calcium hydroxide .............percent.. 5
- Ethyl-hydroxyethylcellulose ......do.... 0.6
- Water ...........................do.... 4
- Green compressive strength ............. 1.90

Test cores made from this mix were treated with carbon dioxide under a pressure of 2 kg. per sq. cm. for varying times with the results indicated below:

| Time, seconds: | Compressive strength, kg. per sq. cm. |
|---|---|
| 0 | 0.25 |
| 4 | 2.80 |
| 8 | 3.00 |
| 12 | 3.10 |
| 16 | 3.00 |
| 20 | 3.20 |

Examples 20–22 below illustrate the effect of adding triethanolamine. The sand mixes were prepared in the same manner as in Examples 1–19. Test cores were treated with carbon dioxide under 2 kg. per sq. cm. during 20 seconds. The green compressive strength was measured on untreated cores. The shear strength and compressive strength were measured immediately after treating with carbon dioxide and after 1 hour, 2 hours and 24 hours storage at room temperature.

*Example 20*

Binders:
- Calcium hydroxide .............percent.. 2
- Ethyl-hydroxyethylcellulose ......do.... 1
- Triethanolamine ..................do.... 0
- Water ...........................do.... 3
- Green compressive strength ............. 1.58

Shear strength:
- Immediately ............................. 1.15
- 1 h. ...................................... 0.78
- 2 h. ...................................... 0.63
- 24 h. ..................................... 2.25

Compressive strength:
- Immediately ............................. 3.70
- 1 h. ...................................... 2.40
- 2 h. ...................................... 1.65
- 24 h. ..................................... 10.20

*Example 21*

Binders:
- Calcium hydroxide .............percent.. 2
- Ethyl-hydroxyethylcellulose ......do.... 1
- Triethanolamine ..................do.... 0.1
- Water ...........................do.... 3
- Green compressive strength ............. 1.79

Shear strength:
- Immediately ............................. 1.65
- 1 h. ...................................... 1.05
- 2 h. ...................................... 0.93
- 24 h. ..................................... 3.45

Compressive strength:
- Immediately ............................. 5.65
- 1 h. ...................................... 4.35
- 2 h. ...................................... 3.25
- 24 h. ..................................... 12.50

*Example 22*

Binders:
- Calcium hydroxide .............percent.. 2
- Ethyl-hydroxyethylcellulose ......do.... 1
- Triethanolamine ..................do.... 0.2
- Water ...........................do.... 3
- Green compressive strength ............. 1.73

Shear strength:
- Immediately ............................. 2.00
- 1 h. ...................................... 1.40
- 2 h. ...................................... 1.25
- 24 h. ..................................... 2.45

Compressive strength:
- Immediately ............................. 5.80
- 1 h. ...................................... 4.20
- 2 h. ...................................... 3.45
- 24 h. ..................................... 12.75

In Examples 23–32 below the sand mixes were prepared and the test cores tested in the same manner as indicated in Examples 1–18.

Example 23

Binders:
- Calcium hydroxide _____percent____ 4
- Ethyl-hydroxyethylcellulose _____do____ 0.6
- Molasses _____do____ 1
- Plaster of Paris_____do____ 2

Water _____do____ 3
Green compressive strength_____ 2.28
Shear strength:
- Immediately _____ 1.3
- 1 h_____ 1.7
- 2 h_____ 1.85
- 24 h_____ 3.5

Compressive strength:
- Immediately _____ 4.35
- 1 h_____ 6.15
- 2 h_____ 6.05
- 24 h_____ >13.0

Example 24

Binders:
- Calcium hydroxide_____percent___ 4
- Ethyl-hydroxyethylcellulose _____do____ 0.6
- Molasses _____do____ 0.5
- Plaster of Paris_____do____ 2

Water _____do____ 3
Green compressive strength_____ 2.55
Shear strength:
- Immediately _____ 1.6
- 1 h_____ 1.65
- 2 h_____ 1.75
- 24 h_____ 4.05

Compressive strength:
- Immediately _____ 5.45
- 1 h_____ 7.0
- 2 h_____ 6.9
- 24 h_____ >13.0

Example 25

Binders:
- Calcium hydroxide_____percent____ 4
- Ethyl-hydroxyethylcellulose _____do____ 0.6
- Molasses _____do____ 1.0

Water _____do____ 3
Green compressive strength_____ 1.94
Shear strength:
- Immediately _____ 1.25
- 1 h_____ 1.45
- 2 hr_____ 1.65
- 24 h_____ 3.0

Compressive strength:
- Immediately _____ 4.8
- 1 h_____ 4.75
- 2 h_____ 4.85
- 24 h_____ 11.75

Example 26

Binders:
- Calcium hydroxide_____percent__ 4
- Ethyl-hydroxyethylcellulose _____do____ 0.4
- Molasses _____do____ 1.0
- Sulfite waste liquor _____do____ 0.5
- Plaster of Paris _____do____ 2
- Ethanolamine _____do____ 0.1

Water _____do____ 3
Green compressive strength_____ 1.90
Shear strength:
- Immediately _____ 1.45
- 1 h_____ 2.05
- 2 h_____ 1.65
- 24 h_____ 3.25

Compressive strength:
- Immediately _____ 4.75
- 1 h_____ 7.0
- 2 h_____ 6.7
- 24 h_____ >13.0

Example 27

Binders:
- Calcium hydroxide _____percent__ 2
- Ethyl-hydroxyethylcellulose _____do____ 0.4
- Molasses _____do____ 1.0

Water _____do____ 2
Green compressive strength_____ 1.22
Shear strength:
- Immediately _____ 0.88
- 1 h_____ 1.25
- 2 h_____ 1.3
- 24 h_____ 2.45

Compressive strength:
- Immediately _____ 2.95
- 1 h_____ 4.25
- 2 h_____ 3.95
- 24 h_____ 9.0

Example 28

Binders:
- Calcium hydroxide _____percent__ 2
- Ethyl-hydroxyethylcellulose _____do____ 0.4
- Molasses _____do____ 1.0
- Plaster of Paris _____do____ 2.0

Water _____do____ 2
Green compressive strength_____ 1.98
Shear strength:
- Immediately _____ 1.0
- 1 h_____ 1.45
- 2 h_____ 1.5
- 24 h_____ 3.4

Compressive strength:
- Immediately _____ 5.05
- 1 h_____ 5.0
- 2 h_____ 5.5
- 24 h_____ 11.5

Example 29

Binders:
- Calcium hydroxide _____percent__ 8
- Ethyl-hydroxyethylcellulose _____do____ 0.6
- Molasses _____do____ 1.0
- Plaster of Paris _____do____ 2

Water _____do____ 5
Green compressive strength_____ 3.00
Shear strength:
- Immediately _____ 1.35
- 1 h_____ 1.85
- 2 h_____ 2.05
- 24 h_____ 3.0

Compressive strength:
- Immediately _____ 5.5
- 1 h_____ 6.4
- 2 h_____ 6.15
- 24 h_____ >13.0

Example 30

Binders:
- Calcium hydroxide _____percent__ 8
- Ethyl-hydroxyethylcellulose _____do____ 0.6
- Molasses _____do____ 0.5
- Plaster of Paris _____do____ 2

Water _____do____ 5
Green compressive strength_____ 3.63
Shear strength:
- Immediately _____ 1.35
- 1 h_____ 1.8
- 2 h_____ 1.75
- 24 h_____ 3.0

Compressive strength:
  Immediately _____ 4.35
  1 h. _____ 5.9
  2 h. _____ 5.7
  24 h. _____ >13.0

*Example 31*

Binders:
  Calcium hydroxide _____percent__ 8
  Ethyl-hydroxyethylcellulose _____do____ 0.6
  Molasses _____do____ 1
Water _____do____ 5
Green compressive strength_____ 2.23
Shear strength:
  Immediately _____ 1.5
  1 h. _____ 1.55
  2 h. _____ 1.45
  24 h. _____ 2.85
Compressive strength:
  Immediately _____ 4.9
  1 h. _____ 4.9
  2 h. _____ 5.4
  24 h. _____ 10.75

*Example 32*

Binders:
  Calcium hydroxide _____percent__ 2
  Ethyl-hydroxyethylcellulose _____do____ 0.4
  Molasses _____do____ 1.0
  Portland cement _____do____ 2.0
Water _____do____ 3
Green compressive strength_____ 0.98
Shear strength:
  Immediately _____ 0.75
  1 h. _____ 0.95
  2 h. _____ 1.25
  24 h. _____ 1.55
Compressive strength:
  Immediately _____ 1.85
  1 h. _____ 3.2
  2 h. _____ 3.4

*Example 33*

A sand mix of the following composition was prepared in the same manner as in the examples above:

Binders:
  Calcium hydroxide _____percent__ 1
  Ethyl-hydroxyethylcellulose _____do____ 0.5
  Linseed oil _____do____ 2
Water _____do____ 2

Cores were made from this sand mix and were treated with carbon dioxide, whereupon they were baked in a furnace. After treatment with carbon dioxide, but before baking the cores had a shear strength of 1.1 kg. per sq. cm. and after 1 hour of baking at 200° C. they had a transverse strength of 355 g. per sq. cm.

*Example 34*

When preparing pulverulent binder compositions it is suitable to grind the calcium hydroxide with fine sand, quartz, zirconium dioxide or other suitable inorganic material. Thereby, the specific gravity is increased which facilitates admixture of the binder composition to the sand. This is illustrated by this example.

Binders:
  Calcium hydroxide _____percent__ 2
  Ethyl-hydroxyethylcellulose _____do____ 0.4
  Quartz flour _____do____ 4
  Molasses _____do____ 0.5
Water _____do____ 3
Compressive strength:
  Immediately _____ 3.5
  1 h. _____ 6.0

The calcium hydroxide, the ethyl-hydroxyethylcellulose and the quartz flour were ground together in a ball mill, whereupon this mixture was added together with the molasses to the sand which was blended as described above.

*Example 35*

Binders:
  Calcium hydroxide _____percent__ 2
  Magnesium oxide _____do____ 1
  Ethyl-hydroxyethylcellulose _____do____ 0.4
Water _____do____ 2
Green compressive strength_____do____ 1.08
Compressive strength:
  Immediately _____ 0.70
  1 h. _____ 0.75
  2 h. _____ 2.25

The sand mix and the test cores were prepared and treated in the same manner as in Examples 1 to 18.

I claim:

1. A binder mix for preparing sand mold members, based upon an alkaline earth metal carbonate as the inorganic binder, consisting essentially of an inorganic binder compound selected from the group consisting of alkaline earth metal oxides and alkaline earth metal hydroxides and an organic binder, in the proportion of from about 1 to about 10 parts of the inorganic binder compound and from about 0.1 to about 3 parts of the organic binder, the said mix being capable of forming a sand mold member upon combination with sand, water and carbon dioxide.

2. A binder mix in accordance with claim 1 in which the alkaline earth metal is selected from the group consisting of calcium and magnesium.

3. A binder mix in accordance with claim 1 in which the organic binder is a water-soluble cellulose derivative.

4. A binder mix in accordance with claim 1 consisting essentially of, in addition, from about 0.1 to about 5 parts of cement.

5. A binder mix in accordance with claim 3 in which the cellulose derivative is a cellulose ether.

6. A binder mix in accordance with claim 3 in which the cellulose derivative is ethyl-hydroxyethyl cellulose.

7. A binder mix in accordance with claim 3 in which the cellulose derivative is a cellulose ester.

8. A binder mix for preparing sand mold members, based upon an alkaline earth metal carbonate as the inorganic binder, consisting essentially of sand, an inorganic binder compound selected from the group consisting of alkaline earth metal oxides and alkaline earth metal hydroxides and an organic binder, in the proportion of from about 1 to about 10% of the inorganic binder compound and from about 0.1 to about 3% of the organic binder by weight of the sand, the said mix being capable of forming a sand mold member upon combination with water and carbon dioxide.

9. A binder mix for preparing sand mold members, based upon an alkaline earth metal carbonate as the inorganic binder, consisting essentially of sand, water, an inorganic binder compound selected from the group consisting of alkaline earth metal oxides and alkaline earth metal hydroxides and an organic binder, in the proportion of from about 1 to about 10% of the inorganic binder compound and from about 0.1 to about 3% of the organic binder by weight of the sand, the said mix being capable of forming a sand mold member upon combination with carbon dioxide.

10. A sand mold member consisting essentially of sand particles bonded together by a mixture, based upon an alkaline earth metal carbonate as the inorganic binder, consisting essentially of an alkaline earth metal carbonate and an organic binder, in the proportion of from about 1 to about 10% of the carbonate and from about 1 to about 3% of the organic binder by weight of the sand.

11. A sand mold member in accordance with claim 10 in which the organic binder is a water-soluble cellulose derivative.

12. A method of making sand mold members bonded together by a binder based upon an alkaline earth metal carbonate as the inorganic binder, for use for metal castings which comprises forming into the desired mold shape a mix consisting essentially of sand, water and from about 1 to about 10% by weight of the sand of an inorganic binder compound selected from the group consisting of alkaline earth metal oxides and alkaline earth metal hydroxides, and reacting said binder compound with carbon dioxide under reaction conditions to form an alkaline earth metal carbonate in situ in an amount sufficient to bind the sand and form the mold member.

13. A process in accordance with claim 12 in which the binder mix comprises an organic binder, in an amount from about 0.1 to about 3% by weight of the sand.

14. A process in accordance with claim 12 in which the inorganic binder is calcium oxide.

15. A process in accordance with claim 12 in which the inorganic binder is calcium hydroxide.

16. A process in accordance with claim 12 in which the inorganic binder is a mixture of calcium hydroxide and magnesium oxide.

17. A process in accordance with claim 12 in which the mix consists essentially of, in addition, from about 0.1 to 5% cement by weight of the sand.

18. A process in accordance with claim 13 in which the organic binder is a water-soluble cellulose derivative.

19. A process in accordance with claim 13 in which the organic binder is a thermosetting synthetic resin.

20. A process in accordance with claim 18 in which the cellulose derivative is a cellulose ether.

21. A process in accordance with claim 18 in which the cellulose derivative is a cellulose ester.

22. A process in accordance with claim 20 in which the cellulose derivative is ethyl hydroxyethylcellulose.

References Cited in the file of this patent

UNITED STATES PATENTS

| | | |
|---|---|---|
| 575,074 | Smith | Jan. 12, 1897 |
| 1,909,008 | Prange | May 16, 1933 |
| 2,383,812 | Navias | Aug. 28, 1945 |
| 2,883,723 | Moore | Apr. 28, 1959 |

FOREIGN PATENTS

| | | |
|---|---|---|
| 986,904 | France | Apr. 11, 1951 |
| 710,099 | Great Britain | Apr. 1, 1952 |
| 158,812 | Australia | Nov. 28, 1952 |
| 531,968 | Canada | Oct. 16, 1956 |